(12) United States Patent
Ohira et al.

(10) Patent No.: US 6,509,410 B2
(45) Date of Patent: Jan. 21, 2003

(54) AQUEOUS COATING COMPOSITION FOR GOLF BALL AND GOLF BALL USING THE SAME

(75) Inventors: Takashi Ohira, Chichibu (JP); Hisako Nakahama, Chichibu (JP); Masayoshi Arai, Ohmiya (JP); Katsunori Shiyama, Ohmiya (JP)

(73) Assignees: Bridgestone Sports Co., Ltd., Tokyo (JP); Cashew Co., Ltd., Saitama-ken (JP)

( * ) Notice: Subject to any disclaimer, the term of this patent is extended or adjusted under 35 U.S.C. 154(b) by 0 days.

(21) Appl. No.: 09/805,560

(22) Filed: Mar. 14, 2001

(65) Prior Publication Data

US 2001/0034398 A1 Oct. 25, 2001

(30) Foreign Application Priority Data

Mar. 27, 2000 (JP) ........................................ 2000-086749

(51) Int. Cl.[7] .................................................. C08K 3/20
(52) U.S. Cl. ....................................................... 524/591
(58) Field of Search ........................................... 524/591

(56) References Cited

U.S. PATENT DOCUMENTS

| | | | | |
|---|---|---|---|---|
| 4,155,892 A | * | 5/1979 | Emmons | 260/29.2 |
| 4,180,491 A | * | 12/1979 | Kim | 260/29.2 |
| 4,780,101 A | * | 10/1988 | Watanabe | 8/192 |
| 5,308,912 A | * | 5/1994 | Margotte | 524/507 |
| 5,461,109 A | * | 10/1995 | Blair | 524/839 |
| 5,830,938 A | | 11/1998 | St. Laurent et al. | |
| 5,852,106 A | * | 12/1998 | Wilmes | 524/591 |

* cited by examiner

Primary Examiner—Edward J. Cain
(74) Attorney, Agent, or Firm—Sughrue Mion, PLLC

(57) ABSTRACT

The aqueous coating composition of the present invention can form a high crosslink density owing to the high hydroxyl value, contains a soft urethane structure and alicyclic structure possessed by the water-soluble urethane polyol and the water-dispersible urethane resin, and also contains tough isocyanurate ring structures possessed by the water-dispersible acrylic resin and the hydrophilic polyisocyanate; accordingly, can give a coating film which is high in impact resistance, abrasion resistance, contamination resistance, etc., which has properties equivalent to those possessed by the films produced from organic solvent type coatings, and which has high durability; therefore, is most suitable for coating a golf ball to be hit by a golf club. A golf ball coated with the aqueous coating composition of the present invention is free from cracking or film peeling when hit by a golf club; is low in scratch, abrasion and contamination with grass sap; therefore, can retain gloss and fine appearance.

20 Claims, No Drawings

AQUEOUS COATING COMPOSITION FOR GOLF BALL AND GOLF BALL USING THE SAME

BACKGROUND OF THE INVENTION (1) Field of the Invention

The present invention relates to an aqueous coating composition for golf ball, capable of forming a coating film of high durability superior in impact resistance, abrasion resistance, contamination resistance, etc., as well as to a golf ball coated with the coating composition.

(2) Description of Related Art

Two-pack type urethane resin coatings are in wide use for various reasons such as (a) they can form a cured film even at ordinary temperatures, (b) the urethane linkage formed thereby is chemically stable and has high water resistance, chemical resistance, etc., and (c) the polyol and polyisocyanate used as the raw materials can be selected widely and the designing of a coating having desired physical and chemical properties can be made at a high freedom. Conventional urethane resin coatings, however, use a large amount of a volatile organic solvent and this has various problems such as handling of hazardous substance, air pollution, offensive odor, waste disposal, aggravation of coating environment, and the like. A recent movement for protection of global environment has accelerated the development of powder coating, ultraviolet-curing coating and aqueous coating. European countries and U.S.A are advanced in the development of coatings of hazard-free and resource saving type, and aqueous coatings are a main stream. Specific forms of aqueous coatings are aqueous solution, emulsion and colloidal dispersion. In the aqueous solution (of resin), the resin used is allowed to have a functional group for hydrophilicity; a curing agent is used except for when the resin is a particular alkyd resin; and heating and drying at high temperatures is necessary. In the emulsion and colloidal dispersion, hydrophobic polymer particles have, on the surfaces, an ion, a hydrophilic polymer, a low-molecular emulsifier, etc. adsorbed or absorbed; and the coating film formed has excellent water resistance and durability. These aqueous coatings, as compared with organic solvent type coatings, are inferior in film properties and have problems in application to a golf ball which requires impact resistance, abrasion resistance and contamination resistance. There is a description on an aqueous two-pack type polyurethane coating for golf ball, in U.S. Pat. No. 5,830,938. In this coating, however, the hydroxyl value determined from the hydroxyl equivalent of the polyol used is as low as 37 to 14, which does not satisfy the impact resistance, abrasion resistance, contamination resistance, etc. intended by the present invention.

In order for a coating to be able to form a coating film satisfactory in impact resistance, abrasion resistance, contamination resistance, etc., the coating film formed must be tough. In order to achieve it, the materials used in the coating need to have structural hardnesses and a crosslinked structure must be formed between polymer molecules. Urethane resins are most appropriate in the availability of the raw materials, the controllability of their reaction, and the achievability of required properties. Hence, it has been desired to develop, from an aqueous urethane resin, a coating for golf ball, capable of forming a film equivalent to that formed by solvent type urethane coatings.

SUMMARY OF THE INVENTION

The present inventors made a study in order to alleviate the above problems. As a result, the present invention has been completed. The present invention lies in the following (1) to (10).

(1) An aqueous coating composition for golf ball, comprising:
  a water-soluble urethane polyol having a hydroxyl value of 100 to 300 mgKOH/g, obtained by reacting a polyol component and a polyisocyanate component, and
  a hydrophilic group-containing polyisocyanate.

(2) An aqueous coating composition for golf ball, comprising:
  a water-soluble urethane polyol having a hydroxyl value of 100 to 300 mgKOH/g, obtained by reacting a polyol component and a polyisocyanate component,
  a water-dispersible urethane resin, and
  a hydrophilic group-containing polyisocyanate.

(3) An aqueous coating composition for golf ball, comprising:
  a water-soluble urethane polyol having a hydroxyl value of 100 to 300 mgKOH/g, obtained by reacting a polyol component and a polyisocyanate component,
  a water-dispersible acrylic resin, and
  a hydrophilic group-containing polyisocyanate.

(4) The aqueous coating composition for golf ball according to any of the above (1) to (3), wherein at least part of the polyol component is a polyol having an alicyclic structure.

(5) The aqueous coating composition for golf ball according to any of the above (1) to (3), wherein at least part of the polyol component is a polyester polyol obtained by reacting a polybasic acid having an alicyclic structure, with a polyol.

(6) The aqueous coating composition for golf ball according to any of the above (1) to (3), wherein at least part of the polyol component is a polyester polyol obtained by reacting a polyol having an alicyclic structure, with a polybasic acid.

(7) The aqueous coating composition for golf ball according to the above (1), wherein at least part of the polyol component is a polyester polyol obtained by reacting a polyol having an alicyclic structure, with a polybasic acid having an alicyclic structure.

(8) The aqueous coating composition for golf ball according to the above (3), wherein at least part of the water-dispersible acrylic resin is a water-dispersible acrylic resin having an isocyanurate ring.

(9) The aqueous coating composition for golf ball according to any of the above (1) to (3), wherein the hydrophilic group-containing polyisocyanate is a hydrophilic group-containing polyisocyanate having an isocyanurate ring.

(10) A golf ball obtained by coating a golf ball body with the aqueous coating composition set forth in any of the above (1) to (3).

DETAILED DESCRIPTION OF THE INVENTION

The water-soluble urethane polyol used in the present invention is a compound having a hydroxyl value of 100 to 300 mgKOH/g, obtained by subjecting a polyol component and a polyisocyanate component to urethanization. The hydroxyl value range of 100 to 300 mgKOH/g possessed by the water-soluble urethane polyol can promise a coating film having intended property levels in impact resistance, abrasion resistance, contamination resistance, etc.

The polyol component is a polyol having, in the molecule, groups necessary for obtaining sufficient water solubility, or a mixed polyol of the above polyol and other polyol. The mixed polyol is preferred because it makes easy the designing of a water-soluble urethane polyol having required properties.

Preferably, at least part of the polyol component, specifically 5 to 60% of the total polyols (including the raw materials for synthesis of polyester polyol, etc.) is a polyol having an alicyclic structure. Also preferably, at least part of the polyol component is a polyester polyol obtained by reacting a polybasic acid containing 10 to 70% of a polybasic acid having an alicyclic structure, with a polyol. Also, the polyol component may be a polyester polyol obtained by reacting a polyol partially containing a polyol having an alicyclic structure, with a polybasic acid, or a polyester polyol obtained by reacting a polyol partially containing a polyol having an alicyclic structure, with a polybasic acid partially containing a polybasic acid having an alicyclic structure.

As the polyol having, in the molecule, groups necessary for obtaining sufficient water solubility, there is preferred a diol having carboxyl group in the molecule, for reasons of raw materials availability, etc. Specifically, there are mentioned dimethylolpropionic acid, 2,2-dimethylolacetic acid, 2,2-dimethylolbutyric acid, 2,2-dimethylolpentanoic acid, dihydroxypropionic acid, dihydroxysuccinic acid, etc.

As the polyol other than the polyol having, in the molecule, groups necessary for obtaining sufficient water solubility, there are specifically mentioned, for example, diols such as ethylene glycol, 1,2-propanediol, 1,3-propanediol, 1,3-butanediol, 1,4-butanediol, 1,6-hexanediol, neopentyl glycol, diethylene glycol, dipropylene glycol, hexylene glycol, dimethylolheptane, polyethylene glycol, polypropylene glycol and the like; triols such as trimethylolethane, trimethylolpropane, glycerine, tris-2-hydroxyethyl isocyanurate and the like; tetraols such as pentaerythritol and the like. As the polyol having an alicyclic structure, there are mentioned 1,3-cyclohexanedimethanol, 1,4-cyclohexanedimethanol, tricyclodecanediol, tricyclodecanedimethanol, hydrogenated bisphenol A, etc. The polyol further includes a polyester polyol, an acrylic polyol, etc.

The polyester polyol is obtained by polycondensation of a polyol and a polybasic acid. As this polyol, there are mentioned, for example, the above-mentioned diols, triols, tetraols and polyols having an alicyclic structure. As the polybasic acid, there are mentioned, for example, aliphatic dicarboxylic acids such as succinic acid, adipic acid, sebacic acid, azelaic acid, dimer acid and the like; aliphatic unsaturated dicarboxylic acids such as fumaric acid, maleic acid, itaconic acid, citraconic acid and the like; aromatic polycarboxylic acids such as phthalic acid, isophthalic acid, terephthalic acid, trimellitic acid, pyromellitic acid and the like; dicarboxylic acids having an alicyclic structure, such as tetrahydrophthalic acid, hexahydrophthalic acid, 1,3-cyclohexanedicarboxylic acid, 1,4-cyclohexanedicarboxylic acid, endomethylenetetrahydrophthalic acid and the like; and tris-2-carboxyethyl isocyanurate.

The acrylic polyol is a (co)polymer of hydroxyl group-containing acrylic monomers. As such acrylic monomers, there are mentioned, for example, hydroxyethyl acrylate, hydroxyethyl methacrylate, hydroxypropyl acrylate, hydroxypropyl methacrylate and hydroxybutyl acrylate.

These polyols can be used singly or in admixture, depending upon the properties required for the coating film formed.

The polyisocyanate component used for urethanization with the polyol component is an ordinarily used polyisocyanate of aromatic type, aliphatic type, alicyclic type or other type. There are specifically mentioned tolylene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate, 1-isocyanato-3,3,5-trimethyl-4-isocyanatomethylcyclohexane, etc. These compounds can be used singly or in admixture.

In the urethanization of the polyol component and the polyisocyanate component, there can be used, as necessary, a tin-based compound (e.g. dibutyltin dilaurate) or an amine type compound (e.g. triethylamine) as a reaction catalyst.

As the organic solvent usable as a solvent in the reaction, there are mentioned acetone, methyl ethyl ketone, tetrahydrofuran, dimethylformamide, dioxane, dimethyl sulfoxide, N-methyl-2-pyrrolidone, etc.

As the base used for neutralization, there are mentioned ammonia, methylamine, ethylamine, propylamine, butylamine, ethanolamine, propanolamine, diethanolamine, dimethylamine, diethylamine, triethylamine, N,N-dimethylethanolamine, etc. These bases can be used singly or in admixture, depending upon the stability of the water-soluble urethane polyol obtained. The preferable amount of the base used for neutralization is, for example, 0.6 to 1.3 equivalents per equivalent of the carboxyl group in water-soluble urethane polyol.

The water-soluble urethane polyol can be used in combination with a water-dispersible urethane resin or with a water-dispersible acrylic resin. The proportion of the water-dispersible urethane resin or water-dispersible acrylic resin used in combination with the water-soluble urethane polyol can be any level. Part of the water-dispersible acrylic resin is preferably a copolymer obtained by using an acrylate monomer having an isocyanurate ring. The water-dispersible acrylic resin is used in an amount of preferably 70% or less in terms of solid content, relative to the total amount of the water-soluble urethane polyol and the water-dispersible acrylic resin.

The water-dispersible urethane resin is obtained, for example, by reacting, in an organic solvent, a polyol having two or more hydroxyl groups in the molecule, with a polyol having, in the molecule, groups necessary for obtaining sufficient water solubility, with a polyisocyanate being added dropwise, conducting neutralization with a base, adding deionized water and dropwise adding a chain extender with stirring using a high-speed dispersion mixer, to give rise to a reaction. As the above materials used in production of the water-dispersible urethane resin, i.e. the polyol having two or more hydroxyl groups in the molecule, the polyol having, in the molecule, groups necessary for obtaining sufficient water solubility, the polyisocyanate, the organic solvent, the base used for neutralization, the catalyst, etc., there are mentioned the corresponding materials used in production of the water-soluble urethane polyol. As the chain extender, there are mentioned amine compounds such as ethylenediamine, 1,2-propanediamine, 1,4-tetramethylenediamine, 1,6-hexamethylenediamine, 1,4-cyclohexanediamine, isophoronediamine, 4,4'-cyclohexylmethanediamine, piperazine, hydrazine, diethylenetriamine, triethylenetetramine and the like; polyols such as ethylene glycol, propylene glycol, 1,4-butanediol, 1,6-hexanediol, polyethylene glycol and the like; water; and so forth.

The water-dispersible acrylic resin is obtained by subjecting an ethylenically unsaturated compound to addition polymerization. As the ethylenically unsaturated compound, there are mentioned, for example, acrylic acid; methacrylic acid; acrylic acid esters such as methyl acrylate, ethyl acrylate, propyl acrylate, isopropyl acrylate, butyl acrylate, isobutyl acrylate, amyl acrylate, isoamyl acrylate, hexyl acrylate, 2-ethylhexyl acrylate, cyclohexyl acrylate, octyl acrylate, decyl acrylate, octadecyl acrylate, 2-hydroxyethyl acrylate and the like; methacrylic acid esters such as methyl methacrylate, ethyl methacrylate, propyl methacrylate, isopropyl methacrylate, butyl methacrylate, isobutyl methacrylate, amyl methacrylate, hexyl methacrylate, 2-ethylhexyl methacrylate, cyclohexyl methacrylate, decyl methacrylate, 2-hydroxyethyl methacrylate and the like; aromatic vinyl compounds such as styrene, α-methylstyrene, divinylbenzene and the like; vinyl compounds such as vinyl acetate, vinyl propionate, vinyl chloride, vinylidene chloride and the like; vinyl cyanide compounds such as acrylonitrile, methacrylonitrile and the like; diolefin compounds such as butadiene, isoprene and the like; amide compounds such as acrylamide, methacrylamide, N-methylacrylamide, N-methylmethacrylamide, N,N-dimethylacrylamide, N,N-dimethylmethacrylamide, N-methylolacrylamide and the like; acrylic acid compounds having an isocyanurate ring, such as isocyanuric acid ethylene oxide-modified diacrylate, isocyanuric acid ethylene oxide-modified triacrylate and the like; and mixtures of two or more kinds of the above.

The hydrophilic group-containing polyisocyanate used for curing the water-soluble urethane polyol or its combination with the water-dispersible urethane resin or the water-dispersible acrylic resin is specifically a hydrophilic compound obtained, for example, by reacting an aromatic, aliphatic or alicyclic polyisocyanate with a polyol such as polyether polyol, polyester polyol or the like. As the aromatic, aliphatic or alicyclic polyisocyanate, there are preferred, for example, hexamethylene diisocyanate, 1-isocyanato-3,3,5-trimethyl-4-isocyanatomethylcyclohexane, and their derivatives having biuret linkage, urethane linkage, uretdione group or isocyanurate ring. Of these, most preferred are derivatives having isocyanurate ring. As to the proportions of (1) the water-soluble urethane polyol or its combination with the water-dispersible urethane resin or the water-dispersible acrylic resin and (2) the hydrophilic group-containing polyisocyanate, used in their reaction, the equivalent ratio of the isocyanate groups in the hydrophilic group-containing polyisocyanate, relative to the total hydroxyl groups in the water-soluble urethane polyol or its combination with the water-dispersible urethane resin or the water-dispersible acrylic resin is preferably 0.8 to 3.0 viewed from the impact resistance, abrasion resistance, contamination resistance, etc. required for the golf ball coated with the aqueous coating composition of the present invention.

The aqueous coating composition for golf ball according to the present invention may further contain, as necessary, additives such as pigment, dye, dispersion stabilizer, viscosity-controlling agent, ultraviolet absorber, antioxidant, light stabilizer, fluorescent whitening agent, leveling agent, antifoaming agent, curing catalyst and the like, in order to impart various properties to the composition.

The aqueous coating composition of the present invention has excellent stickiness to, for example, the ionomer resin used as a surface material for golf ball, and can be used not only as a top coat but also as an intermediate coat or an undercoat.

The aqueous coating composition of the present invention can be applied to a golf ball by spray coating, electrostatic coating or the like and can be cured and dried at temperatures of 60° C. or lower.

DESCRIPTION OF THE PREFERRED EMBODIMENTS

The present invention is described in more detail below by way of Examples and Comparative Examples. However, the present invention is in no way restricted by them. In the Examples and Comparative Examples, "parts" refer to "parts by weight" and "%" refers to "% by weight", in all cases.

Production Example 1

Into a reactor equipped with a reflux condenser, a dropping funnel, a gas inlet tube and a thermometer were fed 201 parts of trimethylolpropane, 184 parts of glycerine, 120 parts of dimethylolheptane, 134 parts of dimethylolpropionic acid and 500 parts of N-methyl-2-pyrrolidone. The mixture was heated to 60° C. with stirring. When the mixture became uniform, 714 parts of hexamethylene diisocyanate was added dropwise. The resulting mixture was heated to 80° C. to give rise to a reaction for 4 hours. The reaction mixture was cooled to 30° C. Thereto were added, with stirring, 101 parts of triethylamine, 170.5 parts of N-methyl-2-pyrrolidone and 1,741.2 parts of deionized water to obtain a water-soluble urethane polyol A.

The water-soluble urethane polyol A had a non-volatile content of 35% and a hydroxyl value of 211 mgKOH/g (solid content).

Production Example 2

Into a reactor equipped with a reflux condenser, a dropping funnel, a gas inlet tube and a thermometer were fed 201 parts of trimethylolpropane, 184 parts of glycerine, 108 parts of 1,4-cyclohexanedimethanol, 134 parts of dimethylolpropionic acid and 500 parts of N-methyl-2-pyrrolidone. The mixture was heated to 60° C. with stirring. When the mixture became uniform, 714 parts of hexamethylene diisocyanate was added dropwise. The resulting mixture was heated to 80° C. to give rise to a reaction for 4 hours. The reaction mixture was cooled to 30° C. Thereto were added, with stirring, 101 parts of triethylamine, 170.5 parts of N-methyl-2-pyrrolidone and 1,718.9 parts of deionized water to obtain a water-soluble urethane polyol B.

The water-soluble urethane polyol B had a non-volatile content of 35% and a hydroxyl value of 230 mgKOH/g (solid content).

Production Example 3

Into a reactor equipped with a reflux condenser, a dropping funnel, a gas inlet tube and a thermometer were fed 292 parts of adipic acid, 344 parts of 1,4-cyclohexanedicarboxylic acid, 201 parts of trimethylolpropane and 416 parts of neopentyl glycol. The mixture was heated to 200 to 240° C. with stirring, to give rise to a reaction for 5 hours, whereby a polyester polyol having a hydroxyl value of 228 was obtained. To the reaction product were added 134 parts of dimethylolpropionic acid and 500 parts of N-methyl-2-pyrrolidone. The resulting mixture was heated to 60° C. with stirring. When the mixture became uniform, 252 parts of hexamethylene diisocyanate was added dropwise. The resulting mixture was heated to 80° C. to give rise to a reaction for 4 hours. The reaction mixture was cooled to 30° C. Thereto were added, with stirring, 101 parts of triethylamine, 247.5 parts of N-methyl-2-pyrrolidone and 1,928 parts of deionized water to obtain a water-soluble urethane polyol C.

The water-soluble urethane polyol C had a non-volatile content of 35% and a hydroxyl value of 131.4 mgKOH/g (solid content).

Production Example 4

Into a reactor equipped with a reflux condenser, a dropping funnel, a gas inlet tube and a thermometer were fed 365 parts of adipic acid, 172 parts of 1,4-cyclohexanedicarboxylic acid, 134 parts of trimethylolpropane, 104 parts of neopentyl glycol, 160 parts of dimethylolheptane, 144 parts of 1,4-cyclohexanedimethanol and 391.5 parts of tris-2-hydroxyethyl isocyanurate. The mixture was heated to 200 to 240° C. with stirring, to give rise to a reaction for 5 hours, whereby a polyester polyol having a hydroxyl value of 271 was obtained. To the reaction product were added 201 parts of dimethylolpropionic acid and 500 parts of N-methyl-2-pyrrolidone. The resulting mixture was heated to 60° C. with stirring. When the mixture became uniform, 336 parts of hexamethylene diisocyanate was added dropwise. The resulting mixture was heated to 80° C. to give rise to a reaction for 4 hours. The reaction mixture was cooled to 30° C. Thereto were added, with stirring, 151.5 parts of triethylamine, 440.7 parts of N-methyl-2-pyrrolidone and 2,402 parts of deionized water to obtain a water-soluble urethane polyol D.

The water-soluble urethane polyol D had a non-volatile content of 35% and a hydroxyl value of 164 mgKOH/g (solid content).

Production Example 5

Into a reactor equipped with a reflux condenser, a dropping funnel, a gas inlet tube and a thermometer were fed 180 parts of 1,4-butanediol, 160 parts of dimethylolheptane, 144 parts of 1,4-cyclohexanedimethanol, 73.7 parts of dimethylolpropionic acid and 500 parts of N-methyl-2-pyrrolidone. The mixture was heated to 60° C. with stirring. When the mixture became uniform, 940.8 parts of hexamethylene diisocyanate was added dropwise. The resulting mixture was heated to 80° C. to give rise to a reaction for 4 hours. The reaction mixture was cooled to 30° C. Thereto were added, with stirring, 55.6 parts of triethylamine, 440.8 parts of N-methyl-2-pyrrolidone and 2,792.7 parts of deionized water. Thereto was dropwise added 129.1 parts of 1,6-hexamethylenediamine with high-speed stirring, and stirring was continued for a further 30 minutes to obtain a water-dispersible urethane resin A. This water-dispersible urethane resin A had a non-volatile content of 30%.

80 parts of the water-soluble urethane polyol B was mixed with 20 parts of the water-dispersible urethane resin A. This mixture had a non-volatile content of 34%.

Production Example 6

82 parts of the water-soluble urethane polyol B was mixed with 18 parts of a water-dispersible acrylic resin (VIACRYL VSC6265W/40WA, a product of Clariant Japan K.K., solid content=40%). This mixture had a non-volatile content of 35.9%.

Production Example 7

Into a reactor equipped with a reflux condenser, a dropping funnel, a gas inlet tube and a thermometer were fed 30.3 parts of triethylamine, 1,442 parts of deionized water and 100 parts of acetone. The mixture was heated to 65° C. with stirring. Thereto was dropwise added, in 3 hours, a uniform mixture consisting of 100 parts of methyl methacrylate, 384 parts of butyl acrylate, 232 parts of 2-ethylhexyl acrylate, 35.7 parts of isocyanuric acid ethylene oxide-modified diacrylate, 21.6 parts of acrylic acid, 1.3 parts of 4,4'-azobiscyanovaleric acid, 1.3 parts of dodecylmercaptan and 50 parts of acetone. The mixture was subjected to a reaction for 1 hour. Then, 0.6 part of 4,4'-azobiscyanovaleric acid was added. The resulting mixture was heated to 75° C. with a nitrogen gas being blown thereinto, and a reaction was allowed to take place for 4 hours while acetone was being recovered, whereby a water-dispersible acrylic resin A was obtained. This water-dispersible acrylic resin A had a solid content of 35%.

80 parts of the water-soluble urethane polyol B was mixed with 20 parts of the water-dispersible acrylic resin A. The mixture had a non-volatile content of 35%.

Production Example 8

Into a reactor equipped with a reflux condenser, a dropping funnel, a gas inlet tube and a thermometer were fed 134 parts of trimethylolpropane, 184 parts of glycerine, 104 parts of neopentyl glycol, 134 parts of dimethylolpropionic acid and 500 parts of N-methyl-2-pyrrolidone. The mixture was heated to 60° C. with stirring. When the mixture became uniform, 924 parts of hexamethylene diisocyanate was added dropwise. The resulting mixture was heated to 80° C. to give rise to a reaction for 4 hours. The reaction mixture was cooled to 30° C. Thereto were added, with stirring, 101 parts of triethylamine, 236 parts of N-methyl-2-pyrrolidone and 1,911.6 parts of deionized water to obtain a water-soluble urethane polyol E.

The water-soluble urethane polyol E had a non-volatile content of 35% and a hydroxyl value of 75.8 mgKOH/g (solid content).

Production Example 9

80 parts of the water-soluble urethane polyol E was mixed with 20 parts of a water-dispersible acrylic resin (VIACRYL VSC6265W/40WA, a product of Clariant Japan K.K., solid content=40%). This mixture had a non-volatile content of 36%.

Production Example 10

80 parts of the water-soluble urethane polyol E was mixed with 20 parts of the water-dispersible urethane resin A. This mixture had a non-volatile content of 34%.

Production Example 11

Into a reactor equipped with a reflux condenser, a dropping funnel, a gas inlet tube and a thermometer were fed 120 part of trimethylolethane, 138 parts of glycerine, 144 parts of 1,4-cyclohexanedimethanol, 160.8 parts of dimethylolpropionic acid and 500 parts of N-methyl-2-pyrrolidone. The mixture was heated to 60° C. with stirring. When the mixture became uniform, 1,110 parts of isophorone diisocyanate was added dropwise. The resulting mixture was heated to 80° C. to give rise to a reaction for 4 hours. The reaction mixture was cooled to 30° C. Thereto were added, with stirring, 101 parts of triethylamine, 330 parts of N-methyl-2-pyrrolidone and 2,175.4 parts of deionized water to obtain a water-soluble urethane polyol F.

The water-soluble urethane polyol F had a non-volatile content of 35% and a hydroxyl value of 64 mgKOH/g (solid content).

Examples 1 to 7 and Comparative Examples 1 to 4
[Preparation of Coatings]

To one of the water-soluble urethane polyols, or its mixture with the water-dispersible urethane resin or with the water-dispersible acrylic resin, all obtained in Production Examples 1 to 11 were added a hydrophilic group-containing isocyanurate-modified hexamethylene diisocyanate (Bayhydur 3,100, a product of Sumitomo Bayer Urethane Co., Ltd., NCO content=17.3%, non-volatile content=100%) or a hydrophilic group-containing polyisocyanate obtained from a hexamethylene diisocyanate derivative containing biuret linkage (DURANATE WX 1543, a product of Asahi Chemical Industry Co., Ltd., NCO content=16.6%, non-volatile content=100%), and deionized water, to prepare coatings each having a composition shown in Table 1 or Table 2.

[Coating of Golf Ball]

Each of the coatings of Examples 1 to 7 and Comparative Examples 1 to 4 obtained above was coated on a two-piece golf ball using an automatic spray gun, in a film thickness of 15 μm. After the coating, the ball was dried at 60° C. for 2 hours, then allowed to stand at room temperature for 16 hours, and used for performance tests.

[Performance Tests]

(1) Sand Abrasion Resistance Test

In a 8-liter porcelain-made ball mill were placed 10 golf balls and 3 liters of bunker sand, and they were mixed for 2 hours, after which the degree of flaw, the degree of reduction in gloss and the degree of sand attachment at the coating film surface of golf ball were examined visually. The results are shown in Table 1 and Table 2.

Evaluation Standard

⊚: very low

○: Low

Δ: High

X: Very high (2) Test of Resistance to Contamination with Grass Sap

In a 8-liter porcelain-made ball mill was placed a mixture obtained by mixing 500 g of the green leaf portion of spinach with 500 g of water; therein were placed 10 coated golf balls; and mixing was conducted for 3 hours. The degree of greenness of each golf ball was measured using a color difference meter to determine the color difference. The results are shown in Table 1 and Table 2.

TABLE 1

|  | Examples | | | | | | |
|---|---|---|---|---|---|---|---|
|  | 1 | 2 | 3 | 4 | 5 | 6 | 7 |
| Composition of coating (parts) | | | | | | | |
| Water-soluble urethane polyol | | | | | | | |
| A | 100 | | | | | | |
| B | | 100 | | | 80 | 82 | 80 |
| C | | | 100 | | | | |
| D | | | | 100 | | | |
| Water-dispersible urethane resin A | | | | | 20 | | |
| Water-dispersible acrylic resin A | | | | | | 20 | |
| VIACRYL VSC6265W/40WA | | | | | | | 18 |
| Hydrophilic group-containing polyisocyanate | | | | | | | |
| Bayhydur 3100 | 42 | 45 | 26 | 32 | 36 | 37 | 42 |
| Duranate | | | | | | | |
| Diluent | 50 | 55 | 26 | 35 | 39 | 45 | 50 |
| Water | | | | | | | |
| Performance | | | | | | | |
| Sand abrasion resistance | | | | | | | |
| Degree of flaw | ○ | ○ | ○ | ⊚ | ⊚ | ○ | ⊚ |
| Degree of reduction of gloss | ○ | ⊚–○ | ⊚–○ | ⊚ | ⊚ | ⊚ | ⊚ |
| Degree of sand attachment | ○ | ○ | ○ | ○ | ○ | ○ | ○ |

TABLE 1-continued

|  | Examples | | | | | | |
|---|---|---|---|---|---|---|---|
|  | 1 | 2 | 3 | 4 | 5 | 6 | 7 |
| Resistance to contamination with grass sap | | | | | | | |
| Color difference | 4.7 | 4.3 | 4.5 | 3.6 | 4.6 | 3.0 | 2.9 |

TABLE 2

|  | Comparative Examples | | | |
|---|---|---|---|---|
|  | 1 | 2 | 3 | 4 |
| Composition of coating (parts) | | | | |
| Water-soluble urethane polyol | | | | |
| E | 100 | 80 | 80 | |
| F | | | | 100 |
| Water-dispersible urethane resin | | | | |
| A | | | 20 | |
| Water-dispersible acrylic resin | | | | |
| VIACRYL VSC6265W/40WA | | 20 | | |
| Hydrophilic group-containing polyisocyanate | | | | |
| Bayhydur 3100 | | | | 12.5 |
| Duranate WX1543 | 16 | 14 | 14 | |
| Diluent | | | | |
| Water | 11 | 6 | 11 | 7 |
| Performance | | | | |
| Sand abrasion resistance | | | | |
| Degree of flaw | X | Δ | X | X |
| Degree of reduction of gloss | X | X | Δ | X |
| Degree of sand attachment | X | X | X | Δ |
| Resistance to contamination with grass sap | | | | |
| Color difference | 9.8 | 9.5 | 9.1 | 9.7 |

What is claimed is:

1. An aqueous coating composition for golf ball comprising:
    a water-soluble urethane polyol having a hydroxyl value of 100 to 300 mgKOH/g, obtained by reacting a polyol component and a polyisocyanate component, and
    a hydrophilic group-containing polyisocyanate, wherein at least part of the polyol component is a polyol having an alicyclic structure.

2. An aqueous coating composition for golf ball comprising:
    a water-soluble urethane polyol having a hydroxyl value of 100 to 300 mgKOH/g, obtained by reacting a polyol component and a polyisocyanate component,
    a water-dispersible urethane resin, and
    a hydrophilic group-containing polyisocyanate, wherein at least part of the polyol component is a polyol having an alicyclic structure.

3. An aqueous coating composition for golf ball comprising:
    a water-soluble urethane polyol having a hydroxyl value of 100 to 300 mgKOH/g, obtained by reacting a polyol component and a polyisocyanate component,
    a water-dispersible acrylic resin, and
    a hydrophilic group-containing polyisocyanate, wherein at least part of the polyol component is a polyol having an alicyclic structure.

4. The aqueous coating composition for golf ball according to claim 1, wherein the polyol having an alicyclic structure is a polyester polyol obtained by reacting a polybasic acid having an alicyclic structure, with a polyol.

5. The aqueous coating composition for golf ball according to claim 2, wherein the polyol having an alicyclic structure is a polyester polyol obtained by reacting a polybasic acid having an alicyclic structure, with a polyol.

6. The aqueous coating composition for golf ball according to claim 3, wherein the polyol having an alicyclic structure is a polyester polyol obtained by reacting a polybasic acid having an alicyclic structure, with a polyol.

7. The aqueous coating composition for golf ball according to claim 1, wherein the polyol having an alicyclic structure is a polyester polyol obtained by reacting a polyol having an alicyclic structure, with a polybasic acid.

8. The aqueous coating composition for golf ball according to claim 2, wherein the polyol having an alicyclic structure is a polyester polyol obtained by reacting a polyol having an alicyclic structure, with a polybasic acid.

9. The aqueous coating composition for golf ball according to claim 3, wherein the polyol having an alicyclic structure is a polyester polyol obtained by reacting a polyol having an alicyclic structure, with a polybasic acid.

10. The aqueous coating composition for golf ball according to claim 1, wherein the polyol having an alicyclic structure is a polyester polyol obtained by reacting a polyol having an alicyclic structure, with a polybasic acid having an alicyclic structure.

11. The aqueous coating composition for golf ball according to claim 2, wherein the polyol having an alicyclic structure is a polyester polyol obtained by reacting a polyol having an alicyclic structure, with a polybasic acid having an alicyclic structure.

12. The aqueous coating composition for golf ball according to claim 3, wherein the polyol having an alicyclic structure is a polyester polyol obtained by reacting a polyol having an alicyclic structure, with a polybasic acid having an alicyclic structure.

13. The aqueous coating composition for golf ball according to claim 3, wherein at least part of the water-dispersible acrylic resin is a water-dispersible acrylic resin having an isocyanurate ring.

14. The aqueous coating composition for golf ball according to claim 1, wherein the hydrophilic group-containing polyisocyanate is a hydrophilic group-containing polyisocyanate obtained by reacting an aromatic polyisocyanate, an aliphatic polyisocyanate or an alicyclic polyisocyanate, with a polyether polyol or a polyester polyol.

15. The aqueous coating composition for golf ball according to claim 1, wherein the hydrophilic group-containing polyisocyanate is a hydrophilic group-containing polyisocyanate having an isocyanurate ring.

16. The aqueous coating composition for golf ball according to claim 2, wherein the hydrophilic group-containing polyisocyanate is a hydrophilic group-containing polyisocyanate having an isocyanurate ring.

17. The aqueous coating composition for golf ball according to claim 3, wherein the hydrophilic group-containing polyisocyanate is a hydrophilic group-containing polyisocyanate having an isocyanurate ring.

18. A golf ball formed by coating the aqueous coating composition according to claim 1 on a golf ball body.

19. A golf ball formed by coating the aqueous coating composition according to claim 2 on a golf ball body.

20. A golf ball formed by coating the aqueous coating composition according to claim 3 on a golf ball body.

* * * * *